(12) United States Patent
Amarger et al.

(10) Patent No.: US 7,084,992 B1
(45) Date of Patent: Aug. 1, 2006

(54) METHOD AND DEVICE FOR DETERMINING A PRINTER PILOT CONFIGURATION FOR A PRINTING PROCESSING

(75) Inventors: Stéphane Amarger, Cesson-Sevigne (FR); Francois Delumeau, Rennes (FR)

(73) Assignee: Canon Research Center-France S.A., Cesson-Sevigne Cedex (FR)

( * ) Notice: Subject to any disclaimer, the term of this patent is extended or adjusted under 35 U.S.C. 154(b) by 0 days.

(21) Appl. No.: 09/220,063

(22) Filed: Dec. 23, 1998

(30) Foreign Application Priority Data

Dec. 23, 1997 (FR) ................................. 97 16319
Jan. 28, 1998 (FR) ................................. 98 00896

(51) Int. Cl.
*G06F 3/12* (2006.01)

(52) U.S. Cl. ..................................... 358/1.13; 715/500
(58) Field of Classification Search .......... 358/1.1–1.9, 358/1.11–1.18; 709/1, 100, 102, 105, 201, 709/321, 322, 327; 713/1, 100; 715/500
See application file for complete search history.

(56) References Cited

U.S. PATENT DOCUMENTS

| | | | |
|---|---|---|---|
| 4,839,829 A * | 6/1989 | Freedman ................... 345/751 |
| 5,040,079 A * | 8/1991 | Shimizu ...................... 358/451 |
| 5,287,194 A * | 2/1994 | Lobiondo .................... 358/296 |
| 5,467,432 A | 11/1995 | Ota ............................. 395/112 |
| 5,511,156 A * | 4/1996 | Nagasaka .................... 358/1.1 |
| 5,580,177 A | 12/1996 | Gase et al. .................. 400/61 |
| 5,687,301 A | 11/1997 | Stokes et al. .............. 395/112 |
| 5,692,111 A * | 11/1997 | Marbry et al. ............. 358/1.15 |
| 5,699,495 A | 12/1997 | Snipp ........................ 395/114 |
| 5,768,489 A * | 6/1998 | Adachi et al. ............. 358/1.18 |
| 5,859,711 A * | 1/1999 | Barry et al. ................ 358/296 |
| 5,926,285 A * | 7/1999 | Takahashi ................... 358/296 |
| 6,134,020 A * | 10/2000 | Masumoto et al. ........ 358/1.16 |
| 6,184,999 B1 * | 2/2001 | Yoshida et al. ............ 358/1.16 |
| 6,298,173 B1 * | 10/2001 | Lopresti ..................... 382/305 |

FOREIGN PATENT DOCUMENTS

EP 0529818 3/1993
EP 0702289 3/1996

* cited by examiner

*Primary Examiner*—King Y. Poon
(74) *Attorney, Agent, or Firm*—Fitzpatrick, Cella, Harper & Scinto

(57) ABSTRACT

The device determines conditions for a processing liable to be carried out on data in a file, by at least one input/output device or unit. To this end the semantics of the processing of the data are determined, and a configuration determination is performed, without modifying the data, to take into account the semantics of the processing of the data in order to determine the configuration of the pilot of the input/output device or unit intended to implement this processing.

40 Claims, 13 Drawing Sheets

Figure 1:
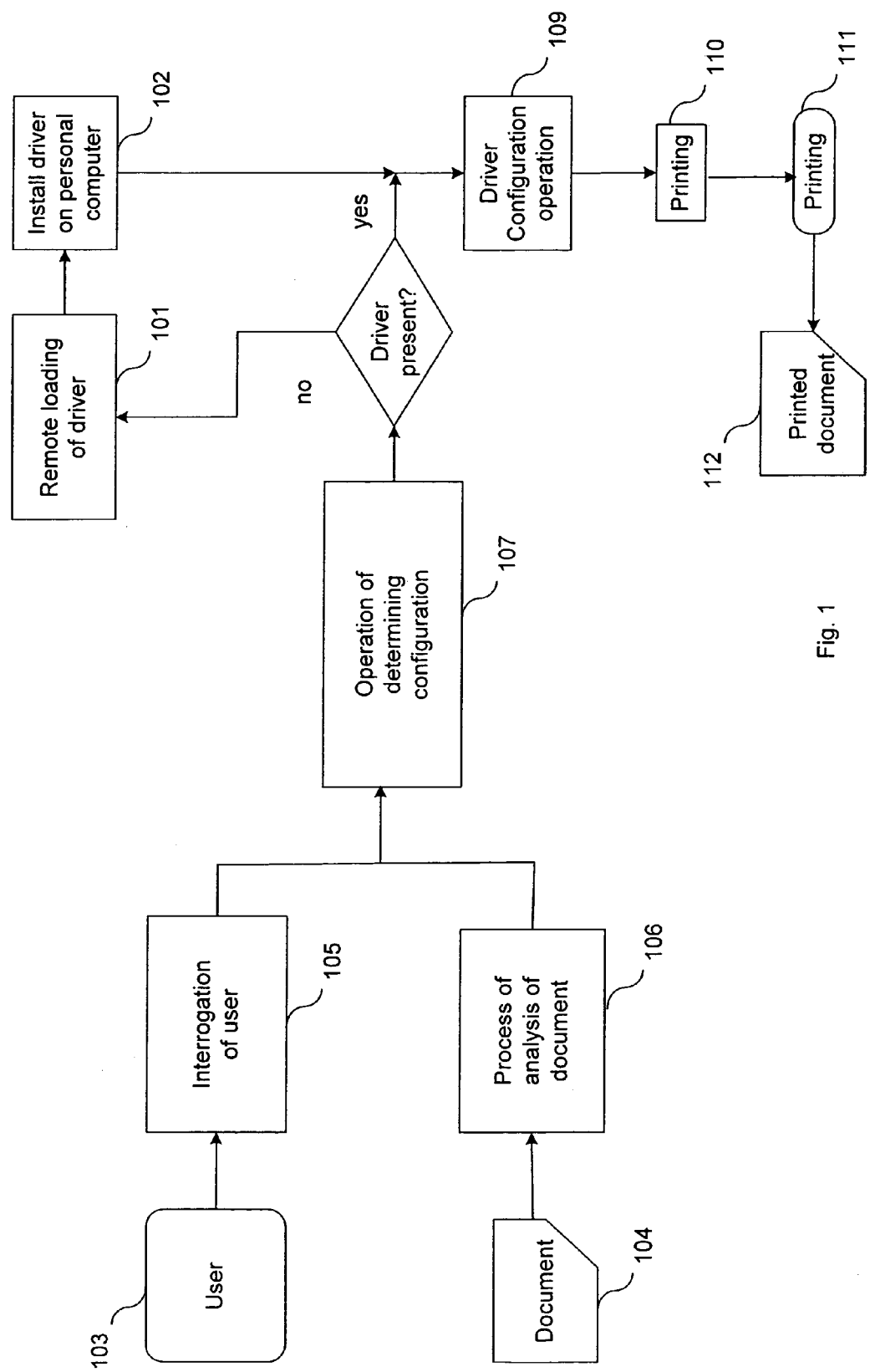

METHOD AND DEVICE FOR DETERMINING A PRINTER PILOT CONFIGURATION FOR A PRINTING PROCESSING

The present invention concerns a method and device for controlling the processing of an electronic document. It should be stated here that an electronic document consists of one or more electronic files.

In the computer systems known at the present time, the peripherals generally have parameterizable operating modes whose parameters are fixed
either at the time of manufacture of the peripheral,
or, by default, by the central unit of the computer system,
or by a dialogue between the user and this computer system.

The operating mode used does not then directly take account of the purpose of the processing, the nature of the data to be processed or the constraints in processing these data by this peripheral.

In particular, in the case of a peripheral consisting of a printer, the constraints imposed by the printing of a document including images, for example the constraints of the duration of printing, the restoration of shades or the quantity of information to be processed, are not directly taken into account by the computer systems in order to fix the printing parameters.

Certain file transfer protocols automatically take into account the form, binary or otherwise, of a file to be transferred in order to configure a file transmission means, without taking into account their semantics.

Certain software packages, such as the "POWERPOINT" presentation software from the "MS OFFICE" software suite produced by the American company MICROSOFT, modify a file corresponding to a document currently being processed, according to models or document media choices. This has the major drawback that the initial file is modified during the procedure.

Certain operating systems, such as the one known by the name "WINDOWS 95", produced by the American company MICROSOFT, take into account user profiles referenced at least by a user name and/or a password, which gives rise to a default configuration of the system for a given user. In particular, this defines a default printer. A printer is then chosen without taking account of the origin or destination of documents which will be printed.

The present invention sets out to remedy these drawbacks.

For this purpose, the present invention relates, according to a first of its aspects, to a device for determining conditions for processing liable to be carried out on data in a file, by at least one input/output means which modulates a physical quantity, characterised in that it has:
a means of determining the semantics of the processing of the said data, and
a configuration determination means adapted, without modifying said data, to take into account the semantics of said processing of said data in order to determine the configuration of the pilot of the input/output means designed to implement this processing.

Correlatively, the present invention relates to a method for determining conditions for processing liable to be carried out on data in a file, by at least one input/output means which modulates a physical quantity, characterised in that it has:
a step of determining the semantics of the processing of the said data, and
a configuration determination step during which, without modifying said data, the semantics of said processing of said data taken into account in order to determine the configuration of the pilot of the input/output means designed to implement this processing.

It should be noted here that the semantics of the processing of the file corresponds to the perception of the result of this processing. It therefore concerns:
both the actual content of the file (a file principally consisting of an image, text, graphics, contrast, colour, etc)
and the destination of the file (display, copy, printing, etc) or the origin of the file (the software which generates the data and the file, the author or the user of the file, etc).

The same file can therefore have successively different semantics and can give rise, according to the present invention, to different configurations of input/output means.

Using different files having the same destination can correspond to different semantics. The same applies to the same document used by different users.

The actual content is therefore different from the apparent content obtained by analysing solely the header or the extension of the file name.

It should be noted here that the pilot configuration concerns both:
a pilot of an input/output means, which is configured, and
several pilots of such means, which are chosen and possibly which are configured.

It should be noted here that, in the state of the art known at the date of the present invention, a pilot is a software module which is situated in a computer system having a processor, a module dedicated to communication with another system having its operating software for effecting a set of elementary operations.

The pilot translates a complex operation required by a high-level software application into a set of elementary operations which can be executed by the peripheral.

The configuration of a pilot amounts to the fixing of the values of each parameter of said translation. These parameters concern for example the translation of the font into a series of points able to be formed by the printer, or of the colour palette of the document into a colour palette of the printer.

Thus, when the invention is, for example, applied to a document to be printed, in order to choose the correct printer configuration:
the document is analysed in order to determine semantic characteristics thereof,
a correct printer configuration is deduced therefrom, and
the printer is configured with the configuration data.

It should be noted here that the printer configuration concerns all the operating parameters, for both the choice of a paper tray and the functioning of the print head.

By virtue of these provisions, the invention makes it possible:
to improve the print chain when a document is printed on a printer;
to choose the correct printer automatically;
to choose the correct configuration of this printer automatically.

According to particular characteristics:
the processing is able to be carried out by at least two input/output means, and
the pilot configuration used by the determination means includes the selection of the input/output means intended to implement the said processing.

By virtue of these provisions, the device according to the invention allows the automatic selection of the input/output means which is intended to implement the processing.

According to particular characteristics:

the device as briefly disclosed above has means of dialoguing with the user adapted to transmit questions to the user and to receive information from him in response, and the configuration determination means is also adapted to take into account the information received, in response, from the user in order to determine the pilot configuration.

By virtue of these provisions, supplementary information concerning the document can be captured by the user in order to remove any ambiguities or conflicts concerning the processing of the data.

According to particular characteristics, the device as briefly disclosed above has a memory adapted to store information received, in response, from the user.

By virtue of these provisions, the information stored in memory make it possible, when a question which has already been posed to a user must be posed to him again:

either to avoid posing this question again, or to remind the user of a response which he has already made to this question, or to propose a response.

According to particular characteristics, said memory is adapted also to store, associated with each item of information received:

an item of information representing the user who supplied it; and/or an item of information representing the document concerned.

By virtue of these provisions, the risk of error is limited when the response given the first time to a question is used under the same circumstances.

According to particular characteristics, the device as briefly disclosed above has a pilot updating means adapted:

on the one hand to detect that a pilot of the input/output means intended to implement the said processing is not available or is not up to date in a memory, and on the other hand, to read the said pilot in another memory.

By virtue of these provisions, when the pilot of the input/output means to be used is not available or is not up to date, for example in a memory of a computer, it is transmitted, for example remotely, from a database constituting said other memory.

According to particular characteristics:

the device as briefly disclosed above has a means of checking the availability of input/output means adapted to transmit an item of information representing unavailability for the processing of said data, when the means intended to process said data is not available for this purpose; and the determination means is adapted to take into account the unavailability information in order to determine the configuration of another input/output means able to implement said processing of said data.

By virtue of these provisions, when an input/output means is not available, another input/output means is selected and configured in order to implement said processing of said data.

The present invention relates, according to another of its aspects, to a method of determining the conditions of a processing liable to be carried out on data of a document by at least one input/output means which uses a physical quantity, characterised in that it includes:

an operation of determining at least two quantities related to the said document, an operation of estimating the content of this document, taking into account each said quantity, and a configuration determination operation during which the content of the document is taken into account in order to determine the configuration of the pilot of the input/output means intended to implement this processing.

It should be stated here that:

the content of a file corresponds to a format of the data which it contains. By way of example, this content may include text, graphics (or drawings) and/or images;

the pilot configuration concerns both:

a pilot of an input/output means, which is configured, and several pilots of such means, which are chosen and possibly which are configured; and the approximate methods based on estimations form part of the methods referred to as heuristic in the literature and make reference to decision criteria, methods or principles used for choosing which of various alternatives is the most effective for achieving an aim. A heuristic is a compromise between on the one hand the need to use simple and/or rapid criteria and on the other hand to discriminate the best choice correctly.

Thus the result of the choice can prove to be ill-suited to the processing to be carried out, unlike exact determination methods, which determine a content in a certain manner.

The reader can refer to the book by Judea Pearl, "*Heuristics, intelligent search strategies for computer problem solving*", published by Addison-Wesley Publishing Company, for more information on the concepts of heuristics and approximate determination.

It should be noted here that, in the state of the art known at the date of the present invention, a pilot is a software module which is found in a computer system including a processor, a module dedicated to communication with another system having its operating software for performing a set of elementary operations.

The pilot translates a complex operation required by a high-level software application into a set of elementary operations which can be executed by the peripheral.

Configuring a pilot amounts to fixing the value of each parameter of the said translation. These parameters concern, for example, the translation of the character font into a series of dots able to be formed by the printer, or of the document colour palette into a colour palette of the printer.

Thus, when the invention is, for example, applied to a document to be printed, in order to choose the correct printer configuration:

the document is analysed in order to determine quantities which correspond to it, such as the duration of opening of the file, the number of pages which it represents, the degree of compression which it is able to have with a given file compression algorithm, the number of numeric information items which it contains, an estimation of the content of the file is then deduced therefrom, text, graphics and/or images, at least one printer suited to this content is determined, which is configured for printing all or part of this document, and the printer is configured with the configuration data.

It should be stated here that the printer configuration concerns all the operating parameters of the printer.

In the case of the printing of a document, the invention makes it possible:

to improve the print chain, and automatically to choose the correct configuration of this printer.

According to particular characteristics, the quantity determination operation includes an operation of scrutinising the data of the said document which are directly accessible to a user.

By virtue of these provisions, the quantities considered represent the data which are directly accessible to the user. They are therefore more precise for determining the content of the document.

According to particular characteristics, the estimation operation is able to be carried out without having to use a software application able to make it possible to modify the content of the said document.

By virtue of these provisions, the estimation time does not include any time for opening the document with a complex software application. It is therefore fast.

According to particular characteristics, the estimation operation includes an operation of reading at least one physical quantity in a file.

By virtue of these provisions, obtaining this physical quantity is particularly easy and fast.

According to particular characteristics,
the processing is able to be carried out by at least two input/output means, and
the pilot configuration determination operation includes an operation of selecting the input/output means intended to implement the said processing.

By virtue of these provisions, the device according to the invention allows the automatic selection of the input/output means which is intended to implement the processing and, in the case of printing, the printer which is most suited to all or part of the document under consideration.

According to particular characteristics:
one of the said quantities represents the number of pages of the document represented by the said document, and/or
one of the said quantities represents the number of numeric information items in the said document.

By virtue of these provisions:
a ratio of the other quantity to that which represents the size of the document, by number of pages or by number of information items, can be produced, and thus the determination of the content of the document can be made independent of the number of pages of this document, and/or
a ratio of the number of numeric information items necessary for the description of a page of the document can be calculated. This is because, in general, documents consisting exclusively of images (for example photographs) use a larger number of numeric data per page than those consisting of drawings, and the latter use more than the documents consisting of text. This ratio therefore makes it possible to estimate the content of the document.

According to particular characteristics, one of the said quantities represents a time taken to open the said document by software able to modify the content thereof.

By virtue of these provisions, the documents which have been created by using this software or which can be modified by the use of this software, can be discriminated from the other documents. This is because, for equal numbers of numeric information items, the time of opening of the first is, at the time of the present invention, generally less than the time of opening of the second ones.

According to particular characteristics:
the ratio of the said quantities represents a degree of compression able to be obtained on the said document by using predetermined compression software, and/or
one of the said quantities represents a time necessary for the compression of the said document by predetermined compression software.

By virtue of these provisions, the content of the document can be determined since, in general, the best degrees of compression and the shortest compression times are obtained with documents whose content is formed by images and then with documents whose content is formed by drawings and then with documents whose content is formed by text.

According to particular characteristics, the method as briefly disclosed above includes an operation of determining parts of the document and, for each of the said parts:
an operation of determining at least two quantities related to the said part,
an operation of estimating the content of the said part, taking into account each quantity related to the said part, and
a configuration determination operation during which the content of the said part is taken into account in order to determine the configuration of the pilot of the input/output means intended to implement this processing on the said part.

By virtue of these provisions, for the processing of each part, for example of each page, the choice of the input/output means and/or the configuration of the input/output pilot can be optimised for each part of the document to be processed.

According to another aspect, the invention relates to a device for determining the conditions of a processing liable to be carried out on data of a document, by at least one input/output means which uses a physical quantity, characterised in that it has:
a means of determining at least two quantities related to the said document,
a means of estimating the content of this document, adapted to take into account each said quantity, and
a configuration determination means adapted to take into account the content of the document in order to determine the configuration of the pilot of the input/output means intended to implement this processing.

The invention also relates to a printer, a facsimile machine, facsimile card, a modem, a display screen, a photographic apparatus and a camera including a sensor, characterised in that they include a device as briefly disclosed above.

According to another aspect, the invention also relates to:
a computer program supported by an information medium, such as a diskette or a compact disc, characterised in that it implements the method of the invention as briefly disclosed above; and
a memory, such as a diskette or a compact disc intended to be read by a data processing system, characterised in that it supports program instructions whose execution by said processing system implements the method of the invention as briefly disclosed above.

Figure 2:
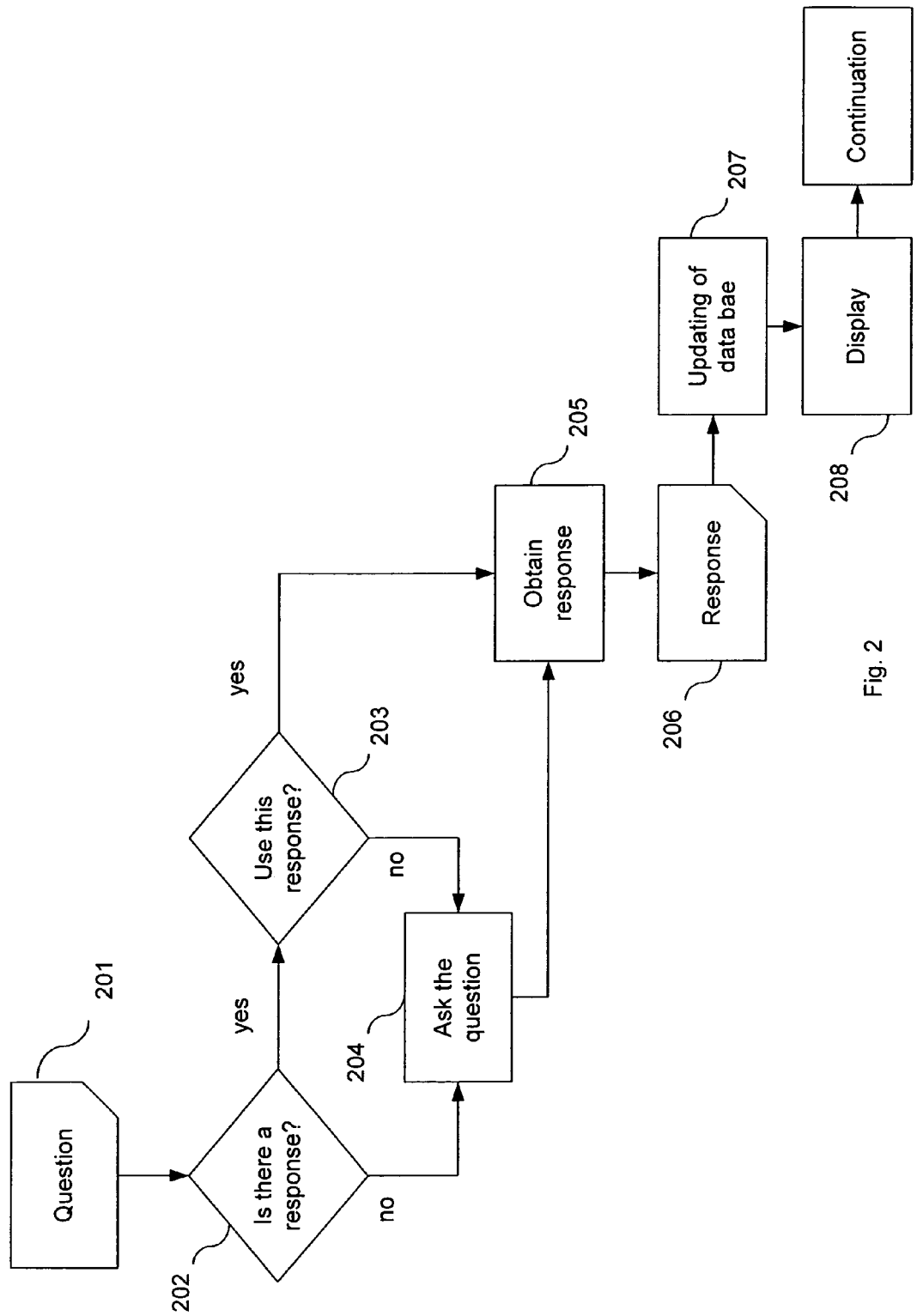
Figure 3:
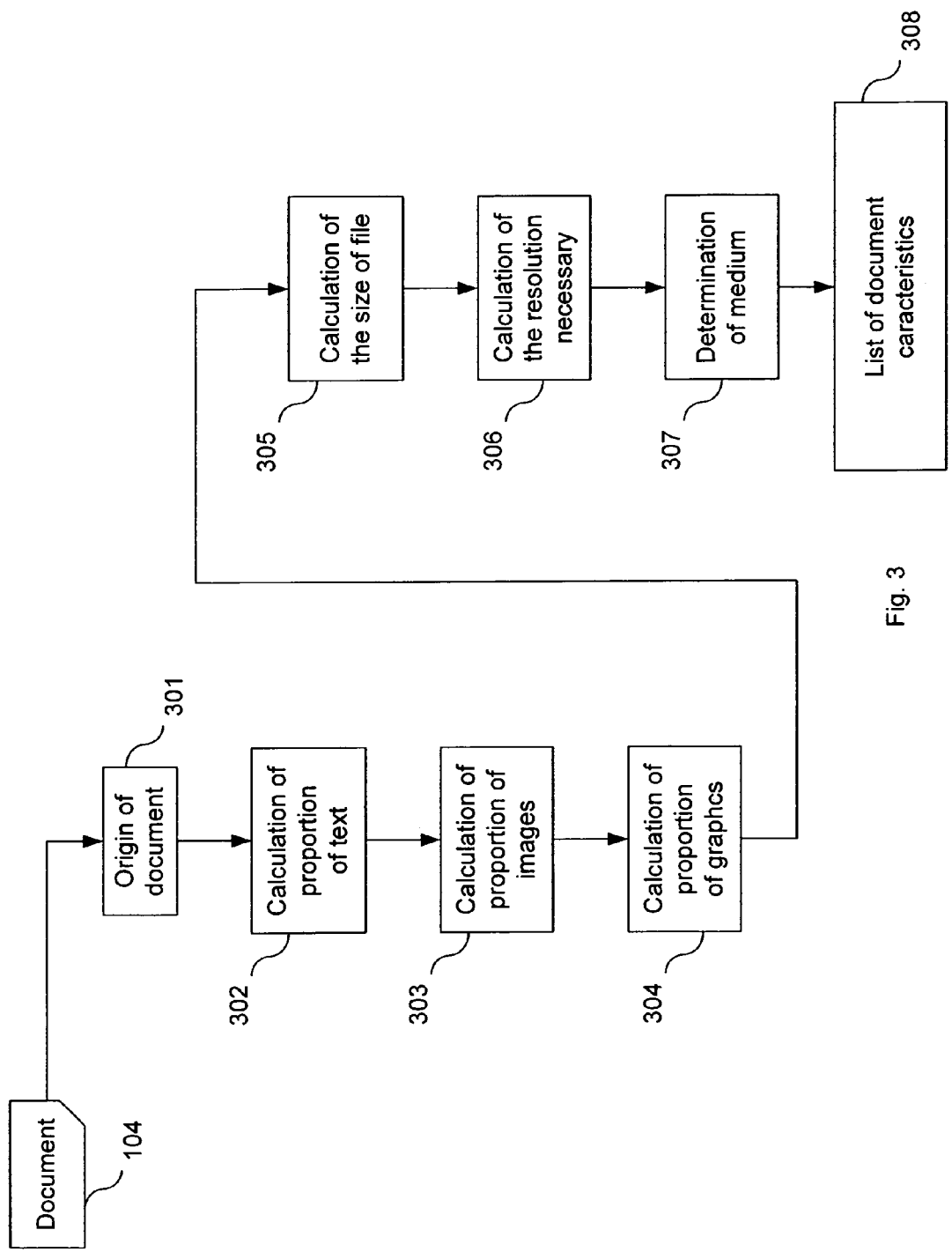
Figure 4:
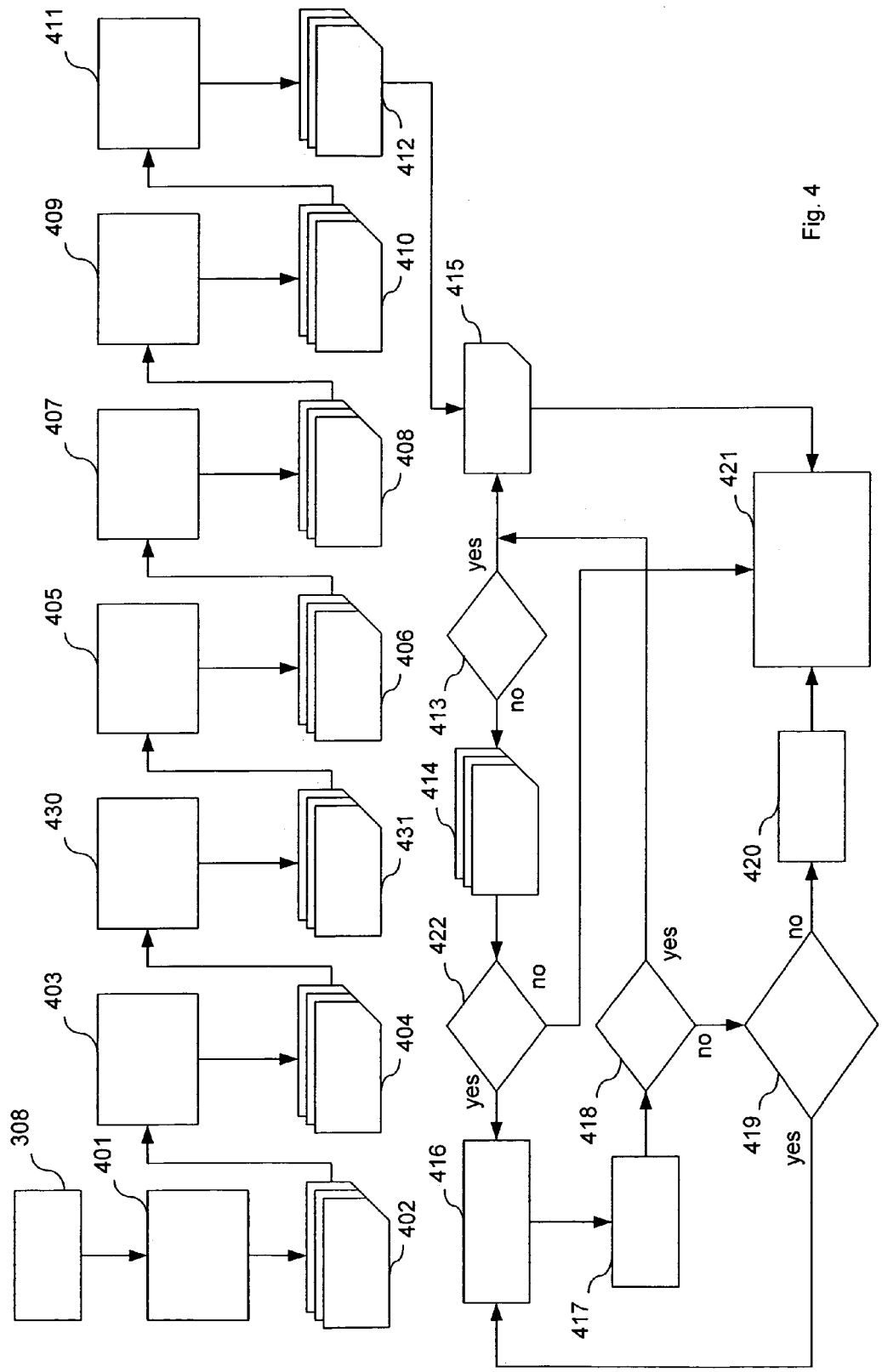
Figure 5:
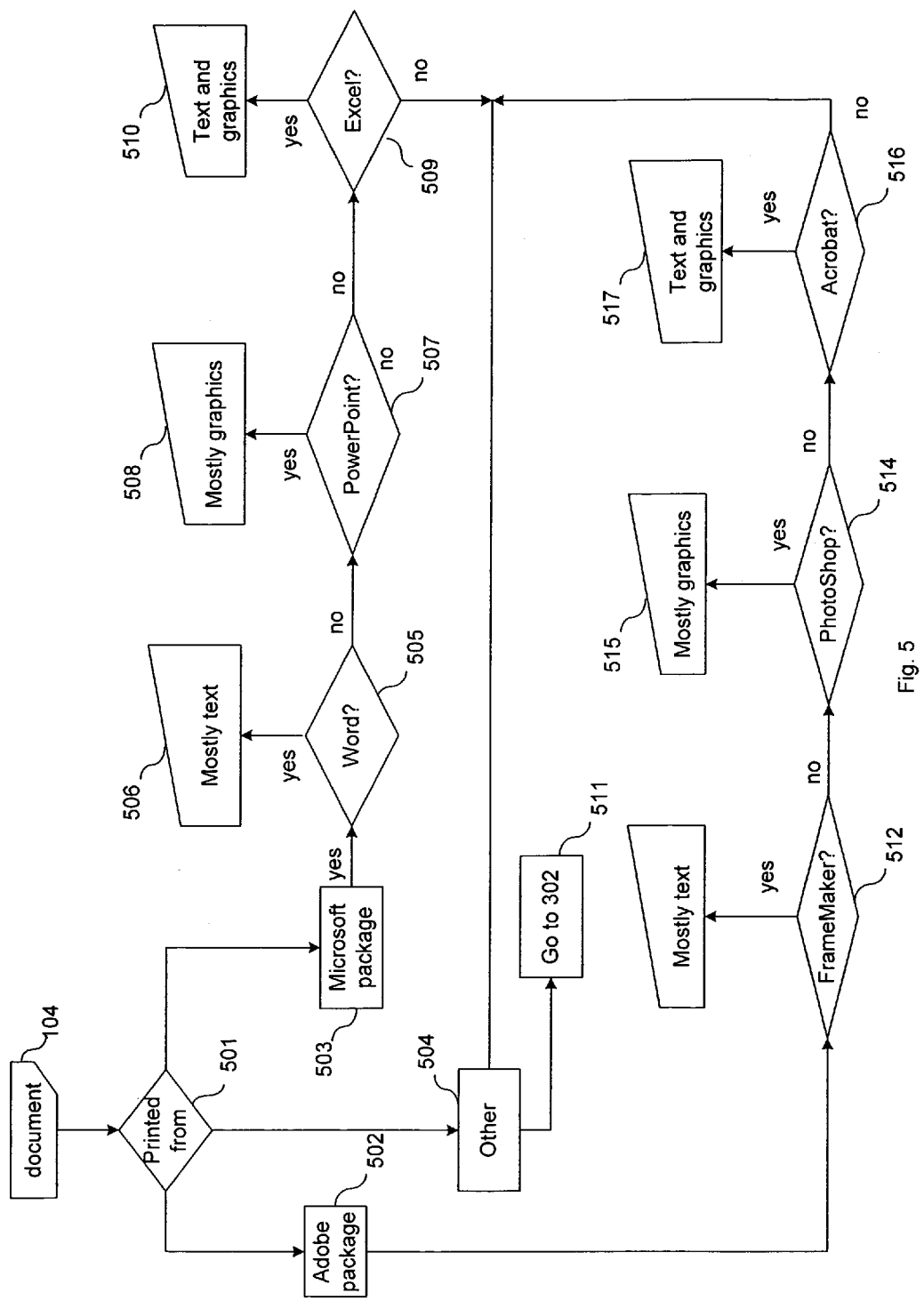
Figure 6:
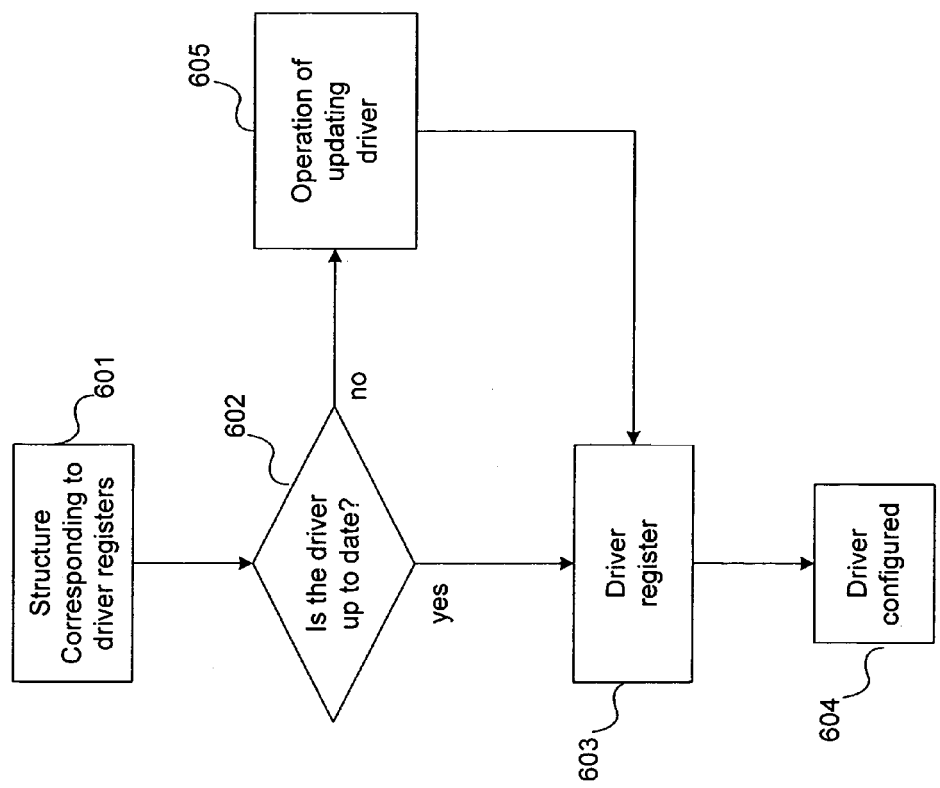
Figure 7:
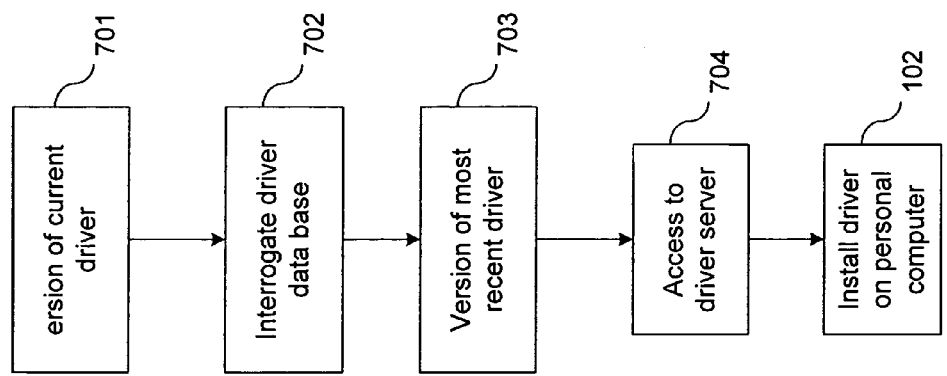
Figure 8:
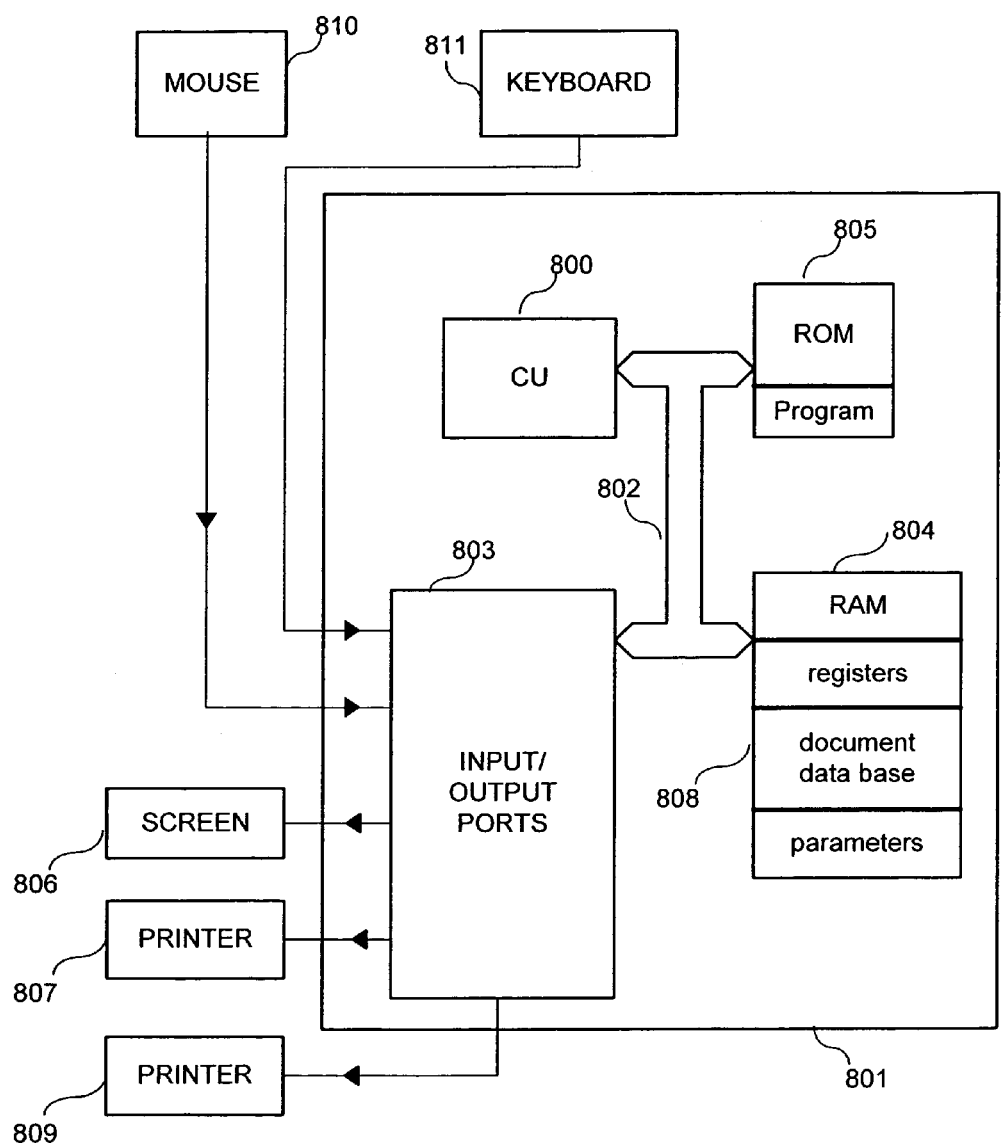
Figure 9:
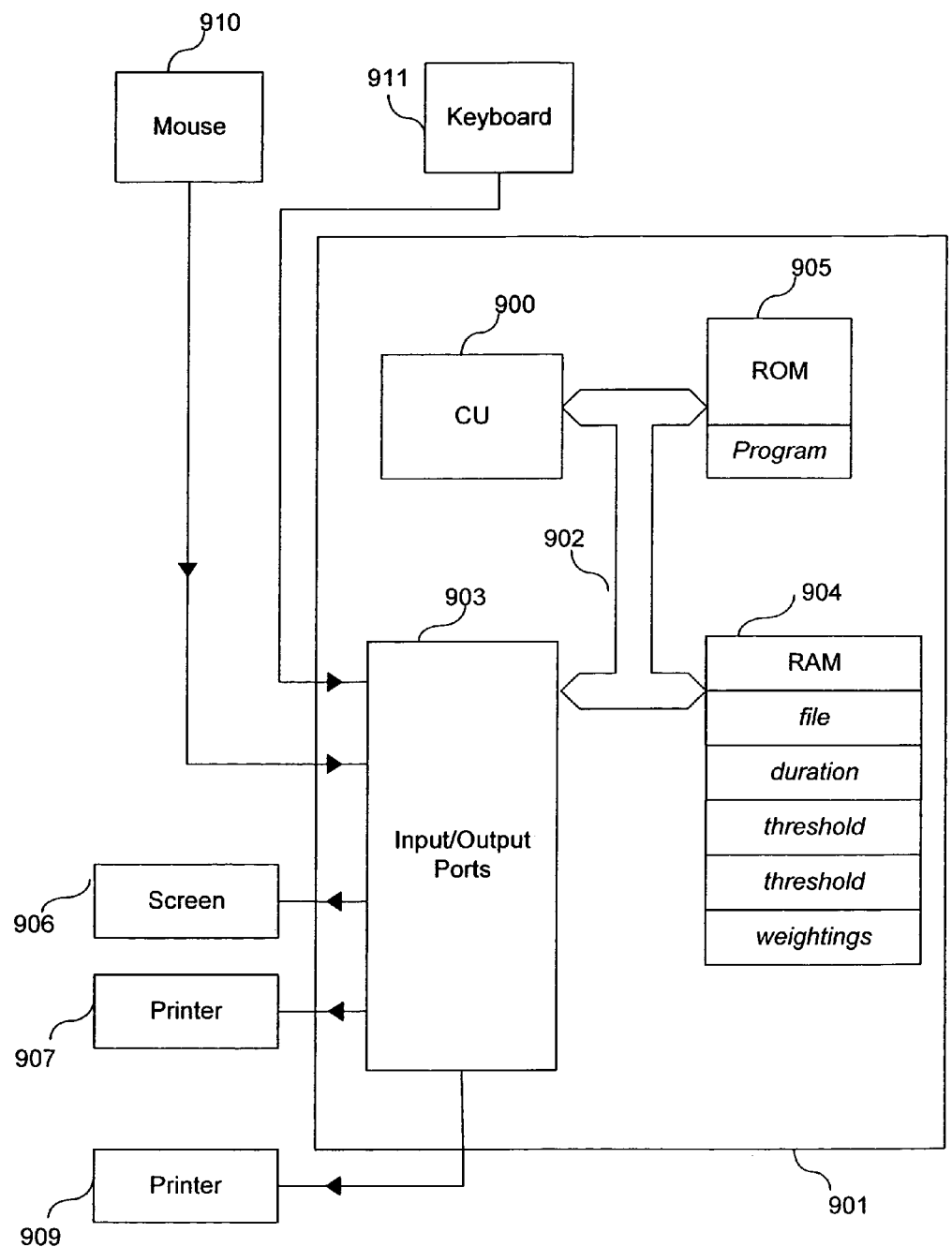
Figure 10A:
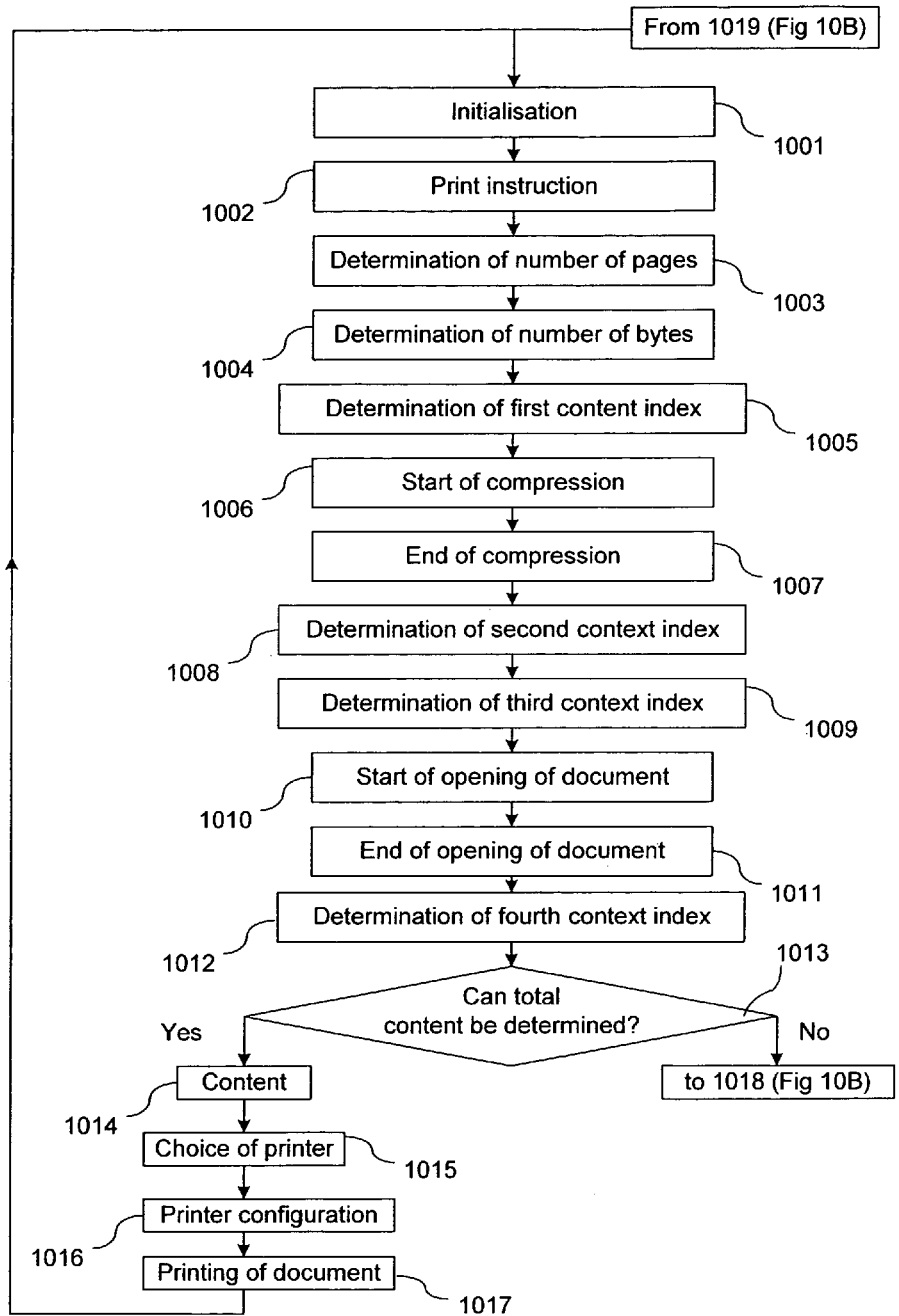
Figure 10B:
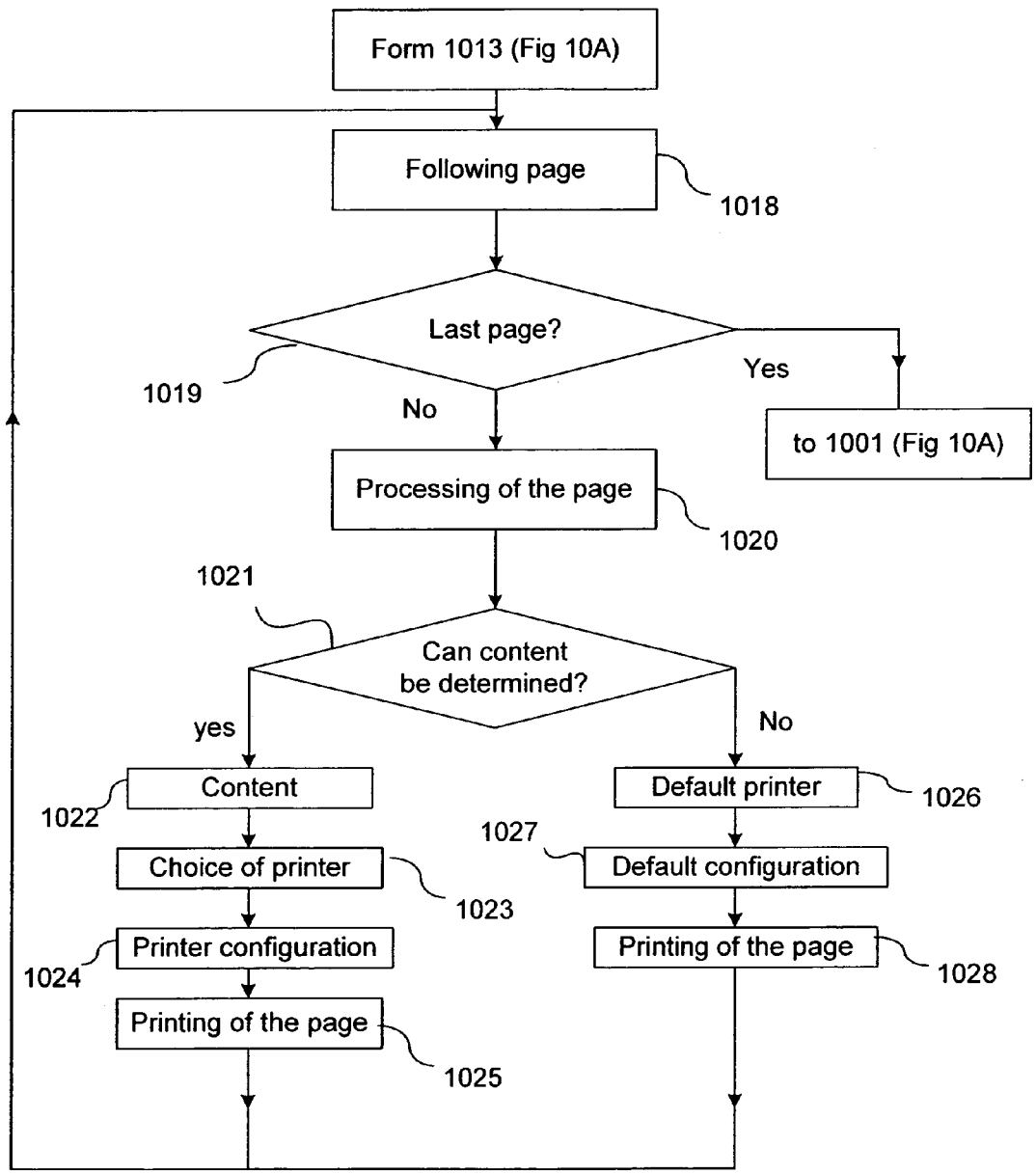
Figure 11A:
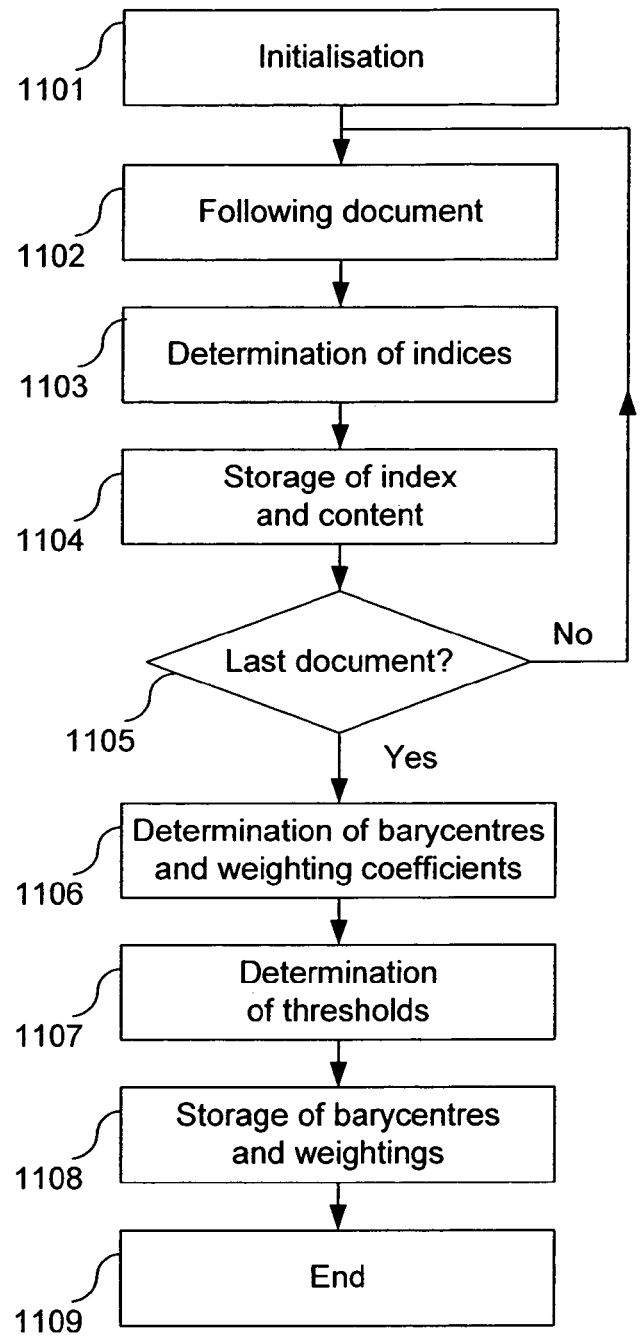
Figure 11B:
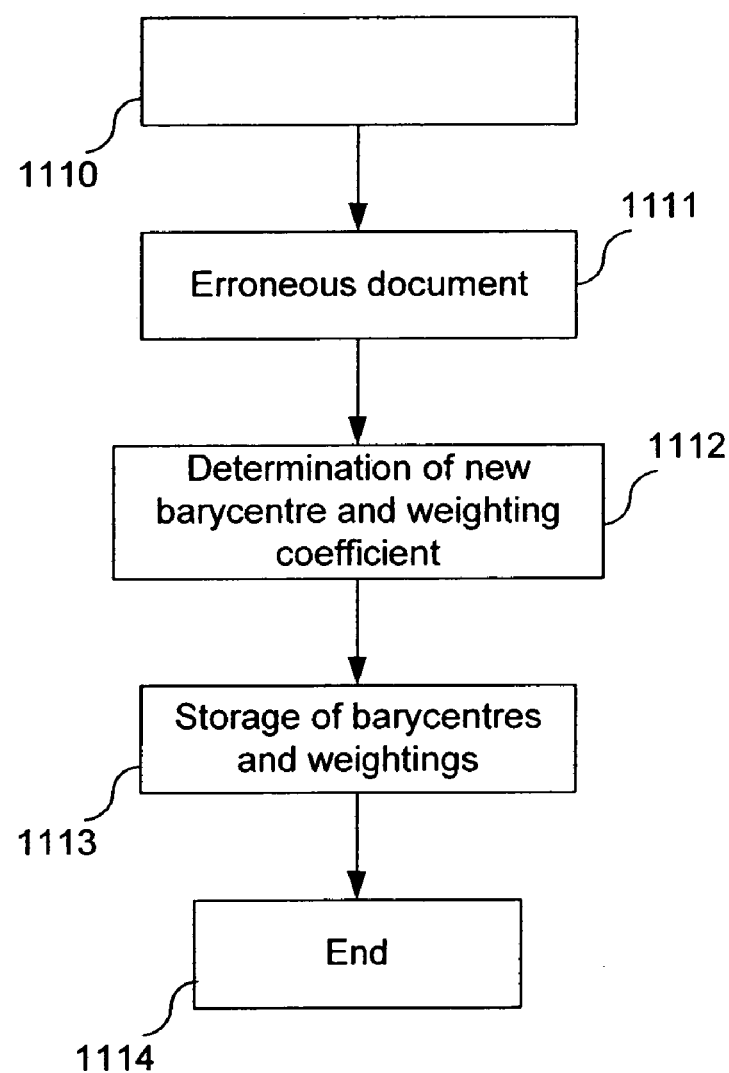

The invention will be understood more clearly from a reading of the description which follows, given with regard to the accompanying drawings, in which:

FIG. 1 depicts a flow diagram of the print chain for a document according to the present invention;

FIG. 2 details part of FIG. 1;

FIG. 3 details part of FIG. 1;

FIG. 4 details part of FIG. 1;

FIG. 5 depicts, in more detail, part of FIG. 3;

FIG. 6 details part of FIG. 1;

FIG. 7 details an operation in FIGS. 1 and 6;

FIG. 8 depicts a device adapted to implement the present invention;

FIG. 9 depicts a device adapted to implement the present invention (two printers, one a laser printer and one an ink jet printer, with two operating modes, monochrome and colour), FIGS. 10A and 10B depict a flow diagram for the operation of the device illustrated in FIG. 9, and FIGS. 11A and 11B depict flow diagrams for determining thresholds liable to be implemented in the flow diagram illustrated in FIG. 10.

In the first embodiment described and depicted with regards to FIGS. 1 to 8, the file processing consists of an application of printing data represented by this file. The invention applies, however, also to any processing of data capture, data transmission, data display, data reading or data storage.

In the remainder of the description, the term "knowledge" is employed to define an item of information which concerns several data items and which relates to their source, their destination or their processing modification of an item of knowledge does not modify the meaning of the data but relates to their presentation, that is to say to the manner in which they are made available, transmitted, captured, read or stored.

In the example described and depicted, the items of knowledge, also referred to as "characteristics", related to a document which a user wishes to print, are, in particular:

the user identifier, the choice between a printing of the "rough draft" type and a printing of the "final document" type.

the choice between a transparent print medium and a paper print medium, the colour of the medium, the fact that the proximity of the printer is required, the fact that the printing time is crucial the choice of the print format, the required reduction ratio:

the choice between printing on both sides and printing on the front face only, the proportion of text in the document, the proportion of image in the document, the proportion of graphics in the document, the size of the document, the printing resolution necessary for the document FIG. 1 depicts operations which are implemented as soon as a user 103 requests a processing (here a printing) of a document 104 consisting of a file stored in a random access memory of the device of the invention, and coming from software of a known type, for example a spreadsheet, a drawing program or wordprocessor software:

an operation 105 of interrogating the user (also referred to as a "user" interface) enabling the user 103 to communicate with the device of the invention (a function partially detailed in FIG. 2), a document analysis operation 106 which works on the document 104, detailed in FIGS. 3 and 5, a configuration determination operation 107, detailed in FIG. 4 and acting on the one hand on the information given by the user 103 by known input means and on the other hand on the results of the document analysis operation 106 in order to determine on the one hand a printer adapted to the printing of the document and on the other hand the configuration of this printer, a printer pilot availability test 108 performed after the configuration determination operation, and, when the printer pilot considered is not available:

a pilot updating operation 101, detailed in FIG. 7, a pilot installation operation 102, of a known type and, when the test 108 determines that the printer pilot is available and the operation 102 has been performed:

a pilot configuration operation 109, detailed in FIG. 6, and a printing operation 110, of a known type, enabling a printer 111 to supply a printed document 112.

The user 103 uses known means (keyboard, mouse, touch screen, microphone, etc) for replying to the questions posed by a computer (see FIG. 8) which implements the present invention in the context of a user interrogation operation 105 or the configuration determination operation 107.

A document database 808 (FIG. 8) is structured in a known fashion. It stores, for each document 104 already printed, a quadruplet consisting of:

the identifier of the document, a list 309 of characteristics or knowledge of this document, the printer corresponding to the last printing, and the printer pilot configuration corresponding to the last printing.

The list of characteristics 309 includes the knowledge resulting from the analysis operation 106 and the knowledge resulting from the dialogue 105 with the user 103, this knowledge being associated with an item of information identifying the user.

The pilot availability test 108 consists of seeking, in the random access memory of the computer which implements the method of the present invention, whether the pilot of the printer selected, during the operation 107, is available or not.

The pilot configuration operation 109 consists of copying, in registers reserved for this purpose, values of information which represent operating parameters of a printer intended to print the document 104.

The print operation 110 consists of sending to the printer 111, when it is configured, the data of the file representing the document to be printed 104.

As a variant, the print operation 110 includes a printer availability test and, when the printer is not available, the choice of a printer whose technical capabilities are such that, after the configuration of this new printer, the characteristics of this printed document will be close to the result expected by the user.

To this end, the print operation 110 includes:

a step of checking the availability of the input/output means selected, during which the availability of the input/output means (that is to say here of the printer) is checked and there is received, from this means, an item of information representing unavailability for the processing of said data, when it is not available for this purpose;

the determination means takes the unavailability information into account in order to determine the configuration of another input/output means able to implement said processing of said data.

In the embodiment described and depicted, in order to effect the choice of the other printer able to print the document 104, when the printer selected during operation 107 is not available, the print operation 110 include the same steps as the operation 107 (see FIGS. 2 and 4), knowing that another document corresponding to the unavailable printer is not considered in these steps, and next returns to operation 108.

When the printer initially selected is not available, it is therefore, iteratively, the printer which, amongst those which remain, is capable of supplying the document which corresponds most closely to the wishes of the user, which is chosen, configured and used.

FIG. 2, which details part of FIG. 1, shows, for each question 201 posed to the user, a test 202 which determines whether a response has already been given to said question.

It should be noted here that the questions posed to the user, during operation 105, concern the semantics of the processing of the document 104:

"rough draft or final document?"
"printing medium transparent or paper?"
"colour of medium?"
"proximity of printer required?"
"printing time crucial?"
"print format?"
"reduction ratio required?"
"printing on both sides or solely on front face?"

In addition, the identifier of the user 103 is automatically supplied at the time of starting up the device of the invention,
  by recognition of the absence of a password,
  by the presence of a password which corresponds to a user, or
  by recognition of a memory card or any other known identification means, or
  through the response to an additional question concerning its identity.

During the test 202, the processor of the computer 100 (FIG. 8) gains access, in the document data base 808, to a memory register which corresponds on the one hand to the user and on the other hand to the question under consideration. When this register is empty, the result of test 202 is negative and operation 204 is performed. When the register stores data representing a possible response to said question, the result of test 202 is positive and test 203 is performed.

Test 203 consists of transmitting to the user a question "There already exists a stored response to this question. Should it be used?", stating the question considered and the stored response.

When the user supplies a positive response, operation 205 is performed. When the user supplies a negative response, operation 204, which consists of displaying the question under consideration on the screen of the computer 100, is performed. Operation 205 consists of receiving the response made by the user, either following operation 204, the response from the user then being effected by using an input interface, or following the positive result of test 203, the response from the user then being read in the register disclosed above. Operation 207 then consists of storing, in said register, this response in the file corresponding to the question posed.

Operation 208 next consists of displaying the response on the screen of the computer 100.

It will be understood that the use of the user interface illustrated in FIG. 2 makes it possible to reduce the duration of capture of the responses, since the questions has already been posed in the same context and the user desires to make the same response to it.

As a variant, a single global question can be used in place of all the tests 203 which correspond to the successive questions: "use the response or responses already known". The single response to this question then replaces each of the responses to tests 203.

FIG. 3 depicts in more detail the document analysis step 106 (FIG. 1).

A document 104 being considered, a document origin determination operation 301 is performed (see FIG. 5) in order to determine with which software the document 104 was generated.

Next, an operation 302 consists of determining a proportion of text in the file 104 under consideration.

Next, an operation 303 consists of determining a proportion of image in the file 104 under consideration.

Next, an operation 304 consists of determining a proportion of graphics in the file 104 under consideration.

These operations 302 to 304 are performed by analysing the file (a so-called GDI file) which in fact contains references to the nature of the objects which it incorporates.

In fact, in a known fashion, a page consists of a certain number of boxes and each box corresponds to an object of a certain type or coming from a certain application. For example, a given page can include simultaneously:
  "image" zones whose content is described, in the file, as an image,
  "text" zones, whose content is described, in the file, as text, and
  "graphics" zones whose content is described, in the file, as a graphic.

Knowing the dimensions of each box, or zone, and their type ("image", "text" or "graphic"), the processor 100 (FIG. 8) determines the proportions of these three types of zone in the document 104 to be printed.

Next, an operation 305 determines document size information, in the form of a pair representing on the one hand the number of pages in the document 104 and on the other hand the number of bytes in the document 104.

Then an operation 306 consists of determining the necessary resolution by reading this information, whose unit is the number of points per unit length, in the file corresponding to document 104.

Next, an operation 307 consists of determining the print medium, by reading this information in the file of the document 104. It should be noted here that this information is available only in documents generated by certain particular software packages. By default, that is to say where said information is not available in the file 104, the paper medium is selected.

Then the operation 308 consists of storing in the memory of the processor 100 (FIG. 8), in a list of characteristics 309 associated with the document 104 under consideration, in the document database 808 containing the knowledge obtained during the operations 301 to 307.

FIG. 4 depicts, in more detail, the knowledge processing operation 107.

A document database 808 including the quadruplets consisting of:
  identifiers of documents already printed,
  characteristics of these documents,
  the printer corresponding to the last printing, and
  the printer pilot configuration corresponding to the last printing, it being considered, the following operations are successively performed, considering a document 104 and its own characteristics stored, in a list 309.

During an operation 401, all the documents which have the same proportion of texts as the proportion of text stored in the list of characteristics 309, are selected. To this end, the proportions of texts are successively compared and, when their difference is less, in percentage terms, than a first predetermined threshold value, the document is selected. By way of example, a first threshold value of 15% can be used. A list of documents 402 having the same proportion of text is thus constituted.

Next, during an operation 403, all the document which have the same proportion of image as the proportion of image stored in the list of characteristics 309 are selected. To this end, the image proportions are successively compared and when their difference is less, in percentage terms, than a second predetermined threshold value (for example 15%), the document is selected. A list of documents 404 having the same proportion of image is thus constituted.

Then, during an operation 430, all the documents which have the same proportion of graphics as the proportion of graphics stored in the list of characteristics 309 are selected. To this end, the proportions of graphics are successively compared and when their difference is less, in percentage terms, than a third predetermined threshold value (for example 15%), the document is selected. A list of documents 431 having the same proportion of graphics is thus constituted.

Then, during an operation 405, all the documents which have the same colour palette as that stored in the list of characteristics 309 are selected. To this end, the colour palettes are successively compared and when they are identical the document is selected. A list of documents 406 having the same colour palette is thus constituted.

Next, during an operation 407, all the document which have the same size as the size stored in the list of characteristics 309 are selected. To this end, the sizes are successively compared and when their difference is less, in percentage terms, then a fourth predetermined threshold value (for example 15%) the document is selected. A list of documents 408 having the same size is thus constituted.

Then, during an operation 409, all the document which have the same resolution as the resolution stored in the list of characteristics 309 are selected. To this end, the resolutions are successively compared and when their difference is less, in percentage terms, than a fifth predetermined threshold value (for example 15%) the document is selected. A list of documents 410 having the same text resolution is thus constituted.

Then, during an operation 411, all the documents which have the same medium as the one stored in the list of characteristics 309 are selected. To this end, the information media are successively compared and, when they are identical, the document is selected. A list of documents 412 having the same print medium is thus constituted.

For the purpose of clarity of the description, the determination of the lists of documents concerning the other characteristics, in particular those resulting from the dialogue 105, are not depicted in FIG. 4. Each of them is effected in the same way as the list 412, selecting all the documents which have, for said characteristic under consideration, the same value as that stored in the list of characteristics 309, comparing them successively. Lists of documents 440, 441, 442, 443, 444, 445, 446, and 447 are thus constituted, corresponding respectively to the responses to the question posed during operation 105:

"rough draft or final document?"
"colour of medium?"
"proximity of printer required?"
"printing time crucial?"
"print format?"
"reduction ratio required?"
"printing on both sides or solely on front face?"
and to the identification of the user.

Next, during a test 413, the processor 100 (FIG. 8) determines whether the documents which belong to the largest number of lists (402, 404, 431, 406, 408, 410, 412 and 440 to 447) all correspond to the same processing characteristics (choice of input/output interface and/or choice of processing pilot configuration).

To this end, starting from 15 (since there are fifteen characteristics considered), the number of characteristics considered is progressively decremented and documents are sought which are situated in said number of lists (402, 404, 431, 406, 408, 410 or 412 and 440 to 447) until there is at least one of them.

When all the documents, here referenced 415, which belong to the largest number of lists, correspond to the same choice of printer and printer configuration, this choice of printer and this configuration are repeated for printing the document under consideration, during operation 421.

When the result of test 413 is negative, that is to say when no document belongs to a list or when at least two documents which belong to the largest number of lists correspond either to different printers or to different printer configurations, an operation 414 consists of making a list, referenced 414, of the documents which belong to the largest number of lists, that is to say documents which respond to the largest number of the fifteen tests 401, 403, 430, 405, 407, 409 or 411 and the corresponding tests, not shown.

During a test 422, the processor 100 controls the display of a question on the screen, in order to determine whether or not the functioning of the device should continue in interactive mode. In the affirmative, that is to say when the user supplies a positive response, in order to determine, amongst the documents in list 414, whether one can supply the processing characteristics (choice of printer and/or printer configuration), the user is requested to put in a hierarchy the characteristics to which the lists in which not all the documents in list 414 are found relate.

Thus, in order to resolve these conflicts, the device according to the invention asks the user the following question, in which are withdrawn the characteristics which correspond to the lists in which there are either all the documents in list 414, or none of them: "Is it more important to favour word processing, graphics, images, the number of colours, the contrast of the colours, the speed of printing, the resolution of the printing?".

For example, if a list 414 contains only two documents and if only the lists 402, 406 and 410 have only one of these two documents, the question posed is "Is it more important to favour the processing of images, the number of colours, the contrast of the colours, the speed of printing and/or the resolution of the printing, the proximity of the printer, the printing time, the printing format, the reduction ratio required, or printing on both sides?".

Next, preserving only the documents which are in the lists relating to a characteristic considered by the user as of prime importance, at least one document is selected during an operation 417.

Then, during a test 418, it is determined whether or not the conflicts are resolved, that is to say if there remains more than one document kept.

In the affirmative, operation 415 is performed. In the negative, a test 419 determined whether the user can refine the order, that is to say if it is possible to sort the documents still further or if they all form part of the same lists.

When the result of test 419 is positive, operation 416 is reiterated.

When the result of test 419 is negative, during an operation 420, the document 104 to be printed is treated as a new document, that is to say the user is requested to choose the document processing characteristics, namely, here:
- the printer which is intended to print it, on the one hand, and
- the configuration of this printer on the other hand.

Thus, during operation 416, the characteristics which are selected by the user allow a new evaluation of the documents in list 414, which are in conflict, and next, where applicable, the choice of one of these documents whose processing characteristics (choice of input/output interface and/or choice of processing pilot configuration) will be attributed to document 104 in the course of processing.

Following operation 420, the knowledge concerning this document is associated with the document represented by the list of characteristics 309, in the document database, during the operation 421.

It will be observed that, when the result of test 422 is negative, operation 421 is directly performed, with the processing parameters fixed, by default, during the configuration of the system or software.

In FIG. 5, operation 301 (FIG. 3) is detailed. A document 104 being considered, test 501 consists of determining whether this document results:
- from the software suite sold under the trade name "MICROSOFT", known as "MS OFFICE" and including notably the software "Word", "Powerpoint" and "Excel", box 503,
- from the software suite sold by the American company "ADOBE" containing notably the software "Framemaker", "Photoshop" and "Acrobat", box 502, or
- from another software, box 504.

To this end, the file name extension, its system signature and its properties are analysed using known techniques taking into account the structure of the files and the meaning of each of its fields.

In the first case, represented in box 503, test 505 determines whether or not the document considered comes from the wordprocessor "Word". When the result of test 505 is positive, the document has a characteristic of being principally composed of text, the characteristic depicted in box 506.

When the result of test 505 is negative, test 507 determines whether or not the document under consideration comes from the "Powerpoint" presentation software. When the result of test 507 is positive, the document has the characteristic of being principally composed of graphics, the characteristic depicted in box 508.

When the result of test 507 is negative, test 509 determines whether or not the document under consideration comes from the "Excel" spreadsheet. When the result of test 509 is positive, the document has the characteristic of principally composed of text and graphics, the characteristic being depicted in box 510.

Where test 501 determines that the document under consideration comes from the "Adobe" suite, the case depicted in box 502, test 512 determines whether or not the document under consideration comes from the "Framemaker" desktop publishing software. When the result of test 512 is positive, the document has the characteristic of being principally composed of text, the characteristic depicted in box 513.

When the result of test 512 is negative, test 514 determines whether or not the document under consideration comes from the "Photoshop" image processing software. When the result of test 514 is positive, the document has the characteristic of being principally composed to graphics, the characteristic depicted in box 515.

When the result of test 514 is negative, the test 516 determines whether or not the document under consideration comes from the "Acrobat" wordprocessing software. When the result of test 516 is positive, the document has the characteristic of being principally composed of texts and graphics, a characteristic depicted in box 517. It should be noted here that, during operation 308, the characteristic determined is stored in the list of characteristics 309.

Finally, when test 501 determines that the document comes from another software package, the case depicted in box 504, operation 302 (FIG. 3) is performed directly. Following a positive result to one of tests 505, 507, 509, 512, 514 or 516 or following a negative result to one of the tests 509 or 516, operation 302 is performed.

FIG. 6 details the operation 109 disclosed in FIG. 1. A pilot configuration being considered, operation 601 consists of seeking in memory the structure corresponding to the register of the printer pilot under consideration. Next, test 602 consists of determining whether or not the printer pilot is up to date. To this end, the current version is compared with the last version on the pilot database, according to known techniques.

When the result of test 602 is negative, an operation 605 of updating the pilot is performed, replacing the pilot already installed with its new version. When the result of test 602 is positive or after the operation 605, operation 603 consists of recording, in the pilot registers, the parameters of the required configuration, and the references of the new version of the pilot. The pilot is then configured (box 604).

FIG. 7 details the operation 101 illustrated in FIGS. 1 and 6.

Operation 701 consists of determining the version of the current pilot, according to known techniques.

Operation 702 next consists of interrogating the pilot database, situated at a distance, in order to obtain therefrom, in return, the date of the most recent pilot version (operation 703).

Operation 704 consists, when the date of the most recent version is different from the date of the current version, of gaining access to the pilot server. Operation 102 (FIG. 1) then consists of downloading the required pilot and installing the pilot, according to known techniques which are not detailed here.

FIG. 8 depicts the main components of an electronic device 801 implementing the present invention. This device 801 has an architecture which is known in the field of programmable electronic systems, based on the use of components connected together by a bus 802 and a central unit 800 controlled by a program, a simplified algorithm of which was presented with regard to FIGS. 1 to 7.

For example, these elements are conjointly associated in a personal computer 100, of a known type, for example of the type functioning with a PENTIUM microprocessor 800 from the American company INTEL which has at least a random access memory, a read only memory, a screen 806, a mouse 810 and a keyboard 811.

An input/output port 803 receives the binary information coming from the user, by means of a keyboard 811, a mouse 810, a touch screen (not shown) or any other communication means, and transmits them, under the control of the central unit 800, to a random access memory RAM 804. In addition, the input/output port 803 transmits, under the control of the central unit 800:

to one of the printers 807 and 809, the data frames intended to control the printer selected in order to print the document 104, and to the screen 806, the data intended to be displayed.

The random access memory RAM 804, of a known type, contains registers intended to receive parameters, variables, digital data and intermediate processing values, as well as the databases mentioned above.

A read only memory ROM 805, of a known type, stores the program which enables the device to operate and, in particular, for the central unit 800. The central unit 800, of a known type, for example consisting of a microcontroller, controls the functioning of the main components of the information transmission device.

In the second embodiment described and depicted with regards to FIGS. 9 to 11B, the file processing consists of an application for printing data represented by this file. The invention also applies, however, to any data storage processing, data transmission processing or data display processing, with or without data compression.

FIG. 9 depicts the main components of an electronic device 901 implementing the present invention. This device 901 has an architecture which is known in the field of programmable electronic systems, based on the use of components connected together by a bus 902 and of a central unit 900 controlled by a program, a simplified algorithm of which is presented in connection with FIG. 10.

For example, these elements are conjointly associated in a personal computer, of a known type, for example of a type operating with a PENTIUM 900 (registered trade mark) microprocessor from the American company INTEL (registered trade mark), which contains at least one random access memory 904, a non-volatile memory 905, a screen 906, a mouse 910 and a keyboard 911.

An input/output port 903 receives the digital information coming from the user, by means of the keyboard 911, the mouse 910, a tactile screen (not shown) or any other communication means, and transmits it, under the control of the central unit 900, to a random access memory RAM 904. In addition, the input/output port 903 transmits, under the control of the central unit 900:

to one of the printers 907, which is a monochrome laser printer, or 909, which is an inkjet printer using different operating modes, some of which are adapted to monochrome printing and others to polychrome printing, the data frames intended to control the printer selected in order to print each page of the document to be printed, and to the screen 906, the data intended to be displayed.

The random access memory RAM 904, of a known type, contains registers intended to receive parameters, variables, digital data and intermediate processing values, as well as the data bases mentioned above.

The non-volatile memory 905, of a known type, stores the program which enables the device and, in particular, the central unit 900, to operate.

The central unit 900, of a known type, for example consisting of a microcontroller, controls the operation of the principal components of the information transmission device.

In FIG. 10, operations and tests successively performed by the central unit 900 for implementing the present invention can be seen.

During an operation 1001, the central unit initialises the device illustrated in FIG. 9, by implementing, for example, the known procedures for starting up the WINDOWS 95 (registered trade mark) operating system.

During an operation 1002, the user enters an instruction for printing a file "file" stored in the non-volatile memory 905, using the mouse 910 or keyboard 911.

During an operation 1003, the central unit 900 determines a first quantity related to the document under consideration: the number of pages represented by the file "file". To this end, the central unit 900 accesses a segment of the file "file" where this information is disposed, or, according to a variant, opens an application able to permit the printing of the said file, formats the said file and collects the number of pages determined by the said application.

During an operation 1004, the central unit 900 determines a second quantity related to the document under consideration: the size of the file "file", in numbers of bytes. To this end, the central unit 900 access a segment of the file "file" where this information is disposed, or, according to a variant, reads the file "file" and counts the number of bytes read.

During an operation 1005, the central unit determines a first index of the content of the file "file" by comparing the ratio of the number of pages represented by the file "file" to the number of bytes in this file, on the one hand, with two predetermined thresholds on the other hand.

This is because the inventor has discovered that the said ratio is low, and generally less than 0.01 for a file content including images, between 0.01 and 0.1 for contents of a file including graphics and texts, and greater than 0.1 for contents of a file including only texts.

The content thus determined is stored in the register "content" of the random access memory 904.

During an operation 1006, the central unit 900 re-zeros a counter "duration" of the random access memory 104, initiates the incrementation of the counter "duration" by the clock (not shown) of the computer system and starts the functioning of data compression software acting on the file "file" in its initial form. In the embodiment described and depicted, the compression algorithm is the algorithm "zip", implemented in the well known software packages "winzip", and "GZIP" available in the main so-called "public domain" software data bases (software packages known to persons skilled in the art under their generic English term "freeware" or "shareware").

During an operation 1007, the central unit 900 completes the compression of the file "file" and stops the incrementation of the file "duration".

The operations 1006 and 1007 thus make it possible to determine two quantities related to the document under consideration: a degree of compression and a period necessary for compression.

During an operation 1008, the central unit 900 determines a second index of the content of the file "File" by comparing the degree of compression obtained using the data compression software on the file "file", on the one hand, with two predetermined thresholds on the other hand.

This is because the inventor has discovered that the said degree is low, and, for example with the algorithm of the "zip" compression software, is generally below 0.20 for a file content including images, between 0.20 and 0.45 for file contents including graphics and texts, and greater than 0.45 for file contents including only texts.

The content thus determined is stored in the register "content" of the random access memory 904, without erasing the content index already stored.

Then, during an operation 1009, the central unit 900 determines a third content index of the file "file" by comparing the time necessary for compression, a time obtained by using the data compression software on the file "file" on the one hand, with two predetermined thresholds on the other hand.

This is because the inventor discovered that the said time is relatively short, and generally less than 10 seconds for a file content including images, between 10 and 30 seconds for file contents including graphics and texts and greater than 30 seconds for file contents which include only texts.

In order to determine the values given above, as well as with regard to the operation 1012, the inventors used the following computer configuration:

- a so-called "IBM PC compatible" computer containing an INTEL PENTIUM processor, with a 100 megahertz clock speed (IBM, INTEL PENTIUM are registered trade marks), and a 16 megabyte random access memory RAM,
- using the WINDOWS 95 operating system sold by MICROSOFT (WINDOWS, WINDOWS 95 AND MICROSOFT are registered trade marks), and
- document sets commonly referred to as "Benchmarks".

The content thus determined is stored in the register "content" of the random access memory 904, without erasure of the content indices already stored.

Then, during an operation 1010, the central unit 900 re-zeros a counter "duration" of the random access memory 904, initiates the incrementation of the counter "duration" by the clock (not shown) of the computer system and starts the operation of an integrated software package (word processing, graphics software) in order to open the file "file", that is to say to make the content thereof accessible to the user.

During an operation 1011, the central unit 900 completes the opening of the file "file" and stops the incrementation of the file "duration".

The operations 1010 and 1011 thus make it possible to determine a quantity related to the document under consideration: a time of opening of the documents by a predetermined application.

During an operation 1012, the central unit 900 determines a fourth content index for the file "file" by comparing the opening time obtained using the integrated software on the file "file" on the one hand, with two predetermined thresholds on the other hand.

This is because the inventor discovered that the said time is small, and, for example with the integrated software known as "WORD" (registered trade mark) sold under the brand name "MICROSOFT", it is generally less than 30 seconds for a file content including images, between 30 seconds and 1 minute for file contents including graphics and texts and greater than 1 minute for file contents including only texts.

The content thus determined is stored in the register "content" of the random access memory 904, without erasure of the content indices already stored.

During a test 1013, the central unit 900 determines whether or not the content of the file "file" can be determined, seeking whether at least three of the four content indices represent the same content. When the result of the test 1013 is positive, during an operation 1014, the content of the file is deemed to be identical to the identical value for at least three of the content industries.

Then the choice of the printer which is most suited to the printing of the assumed content of the file is made, operation 1015, and the configuration of the pilot of this printer is carried out, operation 1016, taking account of the content of the file "file". To this end, when each printer is installed, a question is posed to the user for the latter to indicate, according to known procedures for dialogue with the device, which printer and which printer configuration is the most suited to each document content.

Next, the document is printed by the said printer in the said configuration, and then the central unit returns to the operation 1001.

When the result of the test 1013 is negative, during the first iteration of an operation 1018, the central unit 900 determines parts of a document, these parts here being pages, and takes into consideration the first part of this document. During each following iteration of the operation 1018, it is the page which is the one which was previously considered which is, in its turn, taken into consideration.

Next, during the test 1019, the central unit 900 determines whether or not the last page has been considered. When the result of the test 1019 is positive, the operation 1001 is reiterated. When the result of the test 1019 is negative, during an operation 1020, for the page under consideration of the document represented by the file "file", the possible contents are reinitialised, and, during the single operation 1020, operations identical to the operation 1004 to 1012 are performed on the page under consideration.

During a test 1021, the central unit 900 determines whether or not the content of the page under consideration can be determined, seeking whether or not at least three of the four content indices of the said page have the same value.

When the result of the test 1021 is positive, during an operation 1022, the content of the file is deemed to be identical to the identical value of these three indices. Then, during an operation 1023, the central unit 900 chooses the printer which is best suited to the printing of the assumed content of the page under consideration.

Next, the central unit 900 configures the pilot of this printer which is most suited to the printing of the page under consideration, operation 1024, and then the central unit initiates the printing of the page under consideration with the said printer and the said configuration, operation 1025, and returns to the operation 1019.

When the result of the test 1021 is negative, for the page under consideration, the printer is chosen by default, operation 1026, the configuration is chosen by default, operation 1027, and the page under consideration is printed, operation 1028. Then the operation 1019 is reiterated.

It will be observed here that the operations 1003, 1004, 1006, 1007, 1010, 1011 and 1020 may include a scrutinising of all the data of the document which are directly accessible to the user, without having to use a software application able to allow the user to modify neither the data nor the content of the said document.

According to an embodiment of the invention which is not shown, the processing performed on the data of the document is a data compression, the compression algorithm being chosen as a function of the content of the document. It is known, in fact, that some document compression algorithms (for example with discreet Furrier transform) are more effective for images whilst other compression algorithms (for example of the "zip" type disclosed above) are more effective for texts and drawings.

FIG. 11A depicts a flow diagram for determining thresholds liable to be used in the flow diagram illustrated in FIG. 10, this flow diagram being intended to supply thresholds and other data stored in the non-volatile memory of the device illustrated in FIG. 9.

After an operation 1101 of initialising a device as illustrated in FIG. 9, during an operation 1102, the following document, in a predetermined list of documents, is considered, knowing that, at the first iteration of the operation 1102, it is the first document in this list which is considered.

During an index determination operation 1103, the four content indices are determined, as disclosed above.

During an operation 1104, the central unit 900 causes the display, on the screen 906, of the question:

"Is the content of this document mainly text, drawing or image?", then stores the response given, by the user, by means of the keyboard 911 or mouse 910, in a known fashion, associated with the value of the four content indices.

During a test 1105, the central unit 900 determines whether or not the last document in the list has been considered.

When the result of the test 1105 is negative, the operation 1102 is reiterated. When the result of the test 1105 is positive, during an operation 1106, in succession:

- for all the documents whose content, given during the operation 1104, is of the "text" type, for each index, the means of the values of the said index are determined and given a weighting coefficient equal to the number of documents in question,
- for all the documents whose content, given during the operation 1104, is of the "drawing" type, for each index, the means of the values of the said index are determined and given a weighting coefficient equal to the number of documents in question, and
- for all the documents whose contents, given during the operation 1104, is of the "image" type, for each index, the means of the values of the said index are determined and given a weighting coefficient equal to the number of documents in question.

During an operation 1107, for each index, the means are put in their ascending order and the first threshold is determined at the median value between the two lowest mean values whereas a second threshold is determined as being equal to the median value between the two highest mean values.

For example, if, for the first index, the following documents have been given a value given in the following table:

| Document content | First index value |
| --- | --- |
| text | 0.1 |
| text | 0.2 |
| text | 0.3 |
| drawing | 0.05 |
| drawing | 0.03 |
| drawing | 0.07 |
| image | 0.005 |
| image | 0.003 |
| image | 0.001 | whereas the means of the values of the first index, and their weighting, for each type of content, are:

| content | mean | weighting |
| --- | --- | --- |
| text | 0.2 | 3 |
| drawing | 0.05 | 3 |
| image | 0.003 | 3 | and the thresholds are equal to:

$(3 \times 0.2 + 3 \times 0.05)/6 = 0.125$ (threshold which separates the text from the drawings) and $(3 \times 0.05 + 3 \times 0.003)/6 = 0.0265$ (threshold which separates the drawings from the images).

During an operation 1108, the values of the means of the indices, weighting coefficients and thresholds are stored.

Then the operation of the device is interrupted, operation 1109.

FIG. 11B depicts a threshold correction flow diagram, taking into account the content defects indicated by the user of the device illustrated in FIG. 9.

After an operating sequence illustrated in FIGS. 10A and 10B, operation 1110, when the user uses the keyboard for indicating that a content error has been made, using the keyboard 911 or mouse 910, during an operation 1111, the central unit 900 causes the display, on the screen 906 of the question:

"Is the content of this document mainly text, drawing or image?", then stores the response given, by the user, by means of the keyboard 911 or mouse 910 in a known fashion, associated with the value of the four content indices.

Next, during an operation 1112, new means, new weighting coefficients and new thresholds are determined and stored, as disclosed above, with regard to operations 1106 to 1108.

It will be understood that the correction mode illustrated in FIG. 11B, which takes into account the errors committed by the device according to the invention when it implements the method of the invention with the thresholds which have been determined, at the manufacturer of the patented products, as illustrated in FIG. 11A, makes it possible to improve the determination of the content of the document.

The scope of the invention is not limited to the embodiments described and depicted but quite the contrary extends to any modifications and improvements within the capability of persons skilled in the art.

The invention claimed is:

1. A device for determining a printer pilot configuration of at least one printer for a printing process to be performed on a document in a file, the printer pilot configuration defining printing process parameters of the printer and being adapted for processing the complete document in the file, said device comprising:
   - means for analyzing content of the document in the file to determine values for characteristics of a list of characteristics of the document, wherein the determined values comprise at least a proportion of text, a proportion of image, and a proportion of graphics zones in the document; and
   - configuration determination means adapted, without modifying the document, to take into account the determined values for automatically determining the printer pilot configuration.

2. A device according to claim 1, wherein:
   - the document printing process is able to be performed by at least two printers; and
   - the printer pilot configuration, determined by said configuration determination means, includes selection of the printer intended to perform the document printing process.

3. A device according to claim 1, further comprising:
   - dialogue means for transmitting questions to a user and receiving information from the user in response to the transmitted questions; and
   - means for adding the information received in response from the user to the values for the characteristics of the list of characteristics, in such a manner that said configuration determination means takes into account the added information to determine the printer pilot configuration.

4. A device according to claim 3, further comprising a memory adapted to store the added information received in response to the transmitted questions from the user.

5. A device according to claim 4, wherein said memory is adapted to also store, in association with each item of added information received in response to the transmitted questions from the user, an item of information identifying the user who supplied each item of the added information.

6. A device according to claim 4, wherein said memory is adapted to also store, in association with each item of the added information received in response to the transmitted questions from the user, an item of information representing the document.

7. A device according to claim 1, further comprising printer pilot updating means adapted for
detecting that the printer pilot configuration of printer, intended to perform the document printing process, is not available or is not up to date in a memory, and
reading the printer pilot configuration in another memory when the printer pilot configuration of the printer, intended to perform the document printing process, is either not available or is not up to date in the memory.

8. A device according to claim 1, further comprising:
means for checking availability of the printer which is adapted to transmit an item of information identifying that document printing process is not available, when the printer, intended to perform the document printing process, is not available for this purpose,
wherein the configuration determination means is adapted to take into account the information regarding the unavailability of document printing process in the printer in order to determine a configuration of another printer for performing the document printing process.

9. A device for determining a printer pilot configuration of at least one printer for a printing process to be performed on a document in a file, the printer pilot configuration defining printing process parameters of the printer and being adapted for processing the complete document in the file, said device comprising:
estimation means for estimating value amounts of the presence of text, image and graphics zones in the document; and
configuration determination means, adapted to take into account the value amounts of the estimated presence of text, image, and graphics zones in the document, for determining the printer pilot configuration of the printer intended to perform the document printing process.

10. A device according to claim 9, further comprising quantity determination means for determining at least two quantities related to the document in the file, wherein one of the quantities is a number of pages in the document.

11. A device according to claim 9, further comprising quantity determination means for determining at least two quantities related to the document in the file, wherein one of the quantities is a number of digital information items in the document.

12. A device according to claim 9, further comprising quantity determination means for determining at least two quantities related to the document in the file, wherein one of the quantities is a degree of compression to be obtained on the document using a predetermined compression software.

13. A device according to claim 9, further comprising quantity determination means for determining at least two quantities related to the document in the file, wherein one of the quantities is a period of time necessary for compressing the document using a predetermined compression software.

14. A device according to claim 9, further comprising parts determination means for determining parts of the document,
wherein said estimation means estimates value amounts of the presence of text, image, and graphics zones in each of the parts of the document, and
wherein said configuration determination means is adapted to take into account the value amounts of the estimated presence of text, image, and graphics zones in each of the parts of the document in order to determine the configuration of the printer pilot of the printer intended to implement the document printing process on each of the parts of the document.

15. A device according to claim 9, further comprising quantity determination means for determining at least two quantities related to the document in the file, wherein said quantity determination means is adapted to scrutinize data from the document which are directly accessible to a user.

16. A device according to claim 9, further comprising quantity determination means for determining at least two quantities related to the document in the file, wherein said quantity determination means is adapted to function without using a software application capable of modifying the content of the document.

17. A device according to claim 9, further comprising quantity determination means for determining at least two quantities related to the document in the file, wherein said quantity determination means is adapted to read at least one quantity in a file.

18. A device according to claim 9, wherein:
the document printing process is able to be performed by at least two printers; and
said configuration determination means is adapted to select a printer able to perform the document printing process.

19. A device according to claim 9, further comprising quantity determination means for determining at least two quantities related to the document in the file, wherein one of the quantities is a time period to open the document by a software application capable of modifying the content of the document.

20. A method of determining a printer pilot configuration of at least one printer for a printing process to be performed on a document in a file, the printer pilot configuration defining printing process parameters of the printer and being adapted for processing the complete document in the file, said device comprising:
an analyzing step of analyzing content of the document in the file to determine values for characteristics of a list of characteristics of the document, wherein the determined values comprise at least a proportion of text, a proportion of image, and a proportion of graphics zones in the document; and
a configuration determination step of, without modifying the document, taking into account the determined values for automatically determining the printer pilot configuration.

21. A method according to claim 20, wherein:
the document printing process is able to be performed by at least two printers; and
the configuration determination step includes a step of selecting the printer intended to perform the document printing process.

22. A method according to claim 20, further comprising:
an dialogue step of dialoguing with a user during which questions are transmitted to the user and information is received from the user in response; and
an addition step of adding the information, received in response to the transmitted questions from the user, to the values for the characteristics of the list of characteristics in such a manner that said configuration determination step takes into account the added information received in response to the transmitted questions from the user to determine the printer pilot configuration.

23. A method according to claim 22, further comprising a storage step of storing the added information received in response to the transmitted questions from the user.

24. A method according to claim 23, wherein said storage step also includes associating, with each item of the added information received in response to the transmitted questions from the user, an item of information identifying the user who supplied each item of the added information.

25. A method according to claim 23, wherein said storage step also includes associating, with each item of the added information received in response to the transmitted questions from the user, an item of information representing the document.

26. A method according to claim 20, further comprising a printer pilot updating step, which includes
detecting that the printer pilot configuration printing process is not available or is not up to date in a memory, and
reading the printer pilot configuration in another memory when the printer pilot configuration of the printer, intended to perform the document printing process, is either not available or is not up to date in the memory.

27. A method according to claim 20, further comprising:
a checking step of checking availability of the printer during which an item of information, identifying that document printing process is not available, is transmitted when the printer, intended to perform the document printing process, is not available for this purpose,
wherein, said configuration determination step takes into account the information regarding the unavailability of document printing process in the printers in order to determine a configuration of another printer able to implement the document printing process.

28. A method according to claim 20, further comprising a step of compressing the document.

29. A method for determining a printer pilot configuration of at least one printer for a printing process to be performed on a document in a file, the printer pilot configuration defining printing process parameters of the printer and being adapted for processing the complete document in the file, said method comprising:
an estimating step of estimating value amounts of the presence of text, image, and graphics zones in the document; and
a configuration determination step of, during which the value amounts of the estimated presence of text, image, and graphics zone in the document are taken into consideration, determining a configuration of the printer pilot of the printer intended to perform the document printing process.

30. A method according to claim 29, further including a quantity determination step of determining at least two quantities related to the document in the file, wherein one of the quantities represents a number of pages in the document.

31. A method according to claim 29, further including a quantity determination step of determining at least two quantities related to the document in the file, wherein one of the quantities represents a number of digital information items in the document.

32. A method according to claim 29, further including a quantity determination step of determining at least two quantities related to the document in the file, wherein one of the quantities represents a degree of compression to be obtained on the document by using a predetermined compression software.

33. A method according to claim 29, further including a quantity determination step, of determining at least two quantities related to the document in the file, wherein one of the quantities represents a period of time necessary for compressing the document by a predetermined compression software.

34. A method according to claim 29, further comprising a part determination step of determining parts of the document and, for each of the parts of the document,
wherein said estimating step estimates value amounts of the estimated presence of text, image, and graphic zones in each of the parts of the document, and
wherein said configuration determination step, taking into account the value amounts of the estimated presence of text, image, and graphics zones in each of the parts of the document, determines the configuration of the printer pilot of the printer intended to perform the document printing process on each of the parts of the document.

35. A method according to claim 34, wherein during said part determination step, pages of the document are determined.

36. A method according to claim 29, further including a quantity determination step of determining at least two quantities related to the document in the file, wherein said quantity determination step includes a scrutinizing step of scrutinizing data from the document which are directly accessible to a user.

37. A method according to claim 29, further including a quantity determination step of determining at least two quantities related to the document in the file, wherein said quantity determination step can be performed without having to use a software application capable of modifying the content of the document.

38. A method according to claim 29, further including a quantity determination step of determining at least two quantities related to the document in the file, wherein said quantity determination step includes a reading step of reading at least one quantity in a file.

39. A method according to claim 29, wherein:
the document printing process is able to be performed by at least two printers; and
said configuration determination step includes a selection step of selecting a printer able to perform the document printing process.

40. A method according to claim 29, further including a quantity determination step of determining at least two quantities related to the document in the file, wherein, during said quantity determination step, one of the quantities represents a time period to open the document by a software application capable of modifying the contents of the document.

* * * * *